US009672259B2

(12) United States Patent
Achuthan et al.

(10) Patent No.: US 9,672,259 B2
(45) Date of Patent: Jun. 6, 2017

(54) METHODS AND SYSTEMS TO REFINE SEARCH INFORMATION

(71) Applicant: eBay Inc., San Jose, CA (US)

(72) Inventors: Ashita Achuthan, Cupertino, CA (US); Paden Barber, Palo Alto, CA (US); Jonathan David Chard, Portland, OR (US); Patrick Foss, Portland, OR (US); Jean-Charles Gabaix-Hialé, Palo Alto, CA (US); Krystal Rose Higgins, Campbell, CA (US); Margaret MacDonald, Portland, OR (US); Mark Eppolito, Portland, OR (US); Matthew Bret MacLaurin, Santa Cruz, CA (US); Mica Merce, San Jose, CA (US); Tyler Yong Nugent, Portland, OR (US); Ryan Reeves, Beaverton, OR (US); Bradley Roberts, Dublin, CA (US); James Tenniswood, Eltham (GB); Ladd Van Tol, Portland, OR (US)

(73) Assignee: eBay Inc., San Jose, CA (US)

( * ) Notice: Subject to any disclaimer, the term of this patent is extended or adjusted under 35 U.S.C. 154(b) by 673 days.

(21) Appl. No.: 14/139,580

(22) Filed: Dec. 23, 2013

(65) Prior Publication Data
US 2014/0358733 A1    Dec. 4, 2014

Related U.S. Application Data

(60) Provisional application No. 61/828,269, filed on May 29, 2013.

(51) Int. Cl.
*G06F 17/30* (2006.01)
*G06F 3/0488* (2013.01)
*G06Q 30/06* (2012.01)

(52) U.S. Cl.
CPC ...... *G06F 17/30554* (2013.01); *G06F 3/0488* (2013.01); *G06Q 30/0625* (2013.01)

(58) Field of Classification Search
USPC ...................................... 705/26.62
See application file for complete search history.

(56) References Cited

U.S. PATENT DOCUMENTS

| 8,686,954 B2 * | 4/2014 | Echeverri ........... G06F 3/04883 345/173 |
| 2012/0265647 A1 * | 10/2012 | Negrillo ............ G06F 17/30967 705/26.62 |
| 2013/0097173 A1 * | 4/2013 | Stovicek ............. G06F 3/04883 707/741 |

FOREIGN PATENT DOCUMENTS

WO    WO-2014193986 A1    12/2014

OTHER PUBLICATIONS

Google Search Gets new interface by Marianne Schultz: App shopper blog dated Mar. 16, 2011.*

(Continued)

*Primary Examiner* — Shay S Glass
(74) *Attorney, Agent, or Firm* — Schwegman, Lundberg & Woessner, P.A.

(57) ABSTRACT

Methods and systems to refine search results were described. The system communicates a first user interface to a mobile device that includes search results that include data items. The system receives a first request from the mobile device that includes an indication of at least one swiping motion that is applied across a touch-sensitive screen on the mobile device. The mobile device is associated with a previously selected refinement and corresponding value. The system filters the search results. The refined search results include a second plurality of data items based on the previously selected refinement and the corresponding value. The system generates a second user interface that includes the (Continued)

refined search results. The system communicates the second user interface, over the network, to the mobile device. The second user interface includes the refined search results that include the second plurality of data items to display on the mobile device.

20 Claims, 11 Drawing Sheets

(56) References Cited

OTHER PUBLICATIONS

"International Application Serial No. PCT/US2014/039838, International Preliminary Report on Patentability mailed Dec. 10, 2015", 6 pgs.
"International Application Serial No. PCT/US2014/039838, International Search Report mailed Oct. 16, 2014", 2 pgs.
"International Application Serial No. PCT/US2014/039838, Written Opinion mailed Oct. 16, 2014", 4 pgs.
Schultz, Marianne, "Google Search Gets New Interface", [Online]. Retrieved from the Internet: <http://web.archive.org/web/20111228031924/http://appshopper.com/blog/2011/03/16/googlesearch-gets-new-interface-gestures>, (Dec. 28, 2011), 1 pg.

* cited by examiner

//METHODS AND SYSTEMS TO REFINE SEARCH INFORMATION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2012, All Rights Reserved.

RELATED APPLICATIONS

This application claims the priority benefit of U.S. Provisional Application No. 61/828,269 filed May 29, 2013 which is incorporated in its entirety by reference.

TECHNICAL FIELD

This disclosure relates to methods and systems supporting computing and data processing systems. More particularly, methods and systems to refine search results are described.

RELATED ART

Users may repeatedly search for data items in a database. Sometimes those same users are frustrated by interfaces that are not efficient.

BRIEF DESCRIPTION OF THE DRAWINGS

Embodiments are illustrated by way of example and not limitation in the figures of the accompanying drawings, in which.

DETAILED DESCRIPTION

Methods and systems to refine search results are described. Search results may be automatically refined with a double or single swipe motion being applied across a touch sensitive screen causing a previously selected refinement and a previously selected value, that is associated with the refinement, to be applied as a filter to search results that were identified with one or more other constraints (e.g., keywords). Responsive to the single or double swipe motion: the search results may be refined in real-time on a search panel based on the filter; a parent panel is opened to display refinements including the previously selected refinement that was utilized in the filter; and a child panel is opened to display values including the previously selected value that was utilized in the filter.

Figure 1:
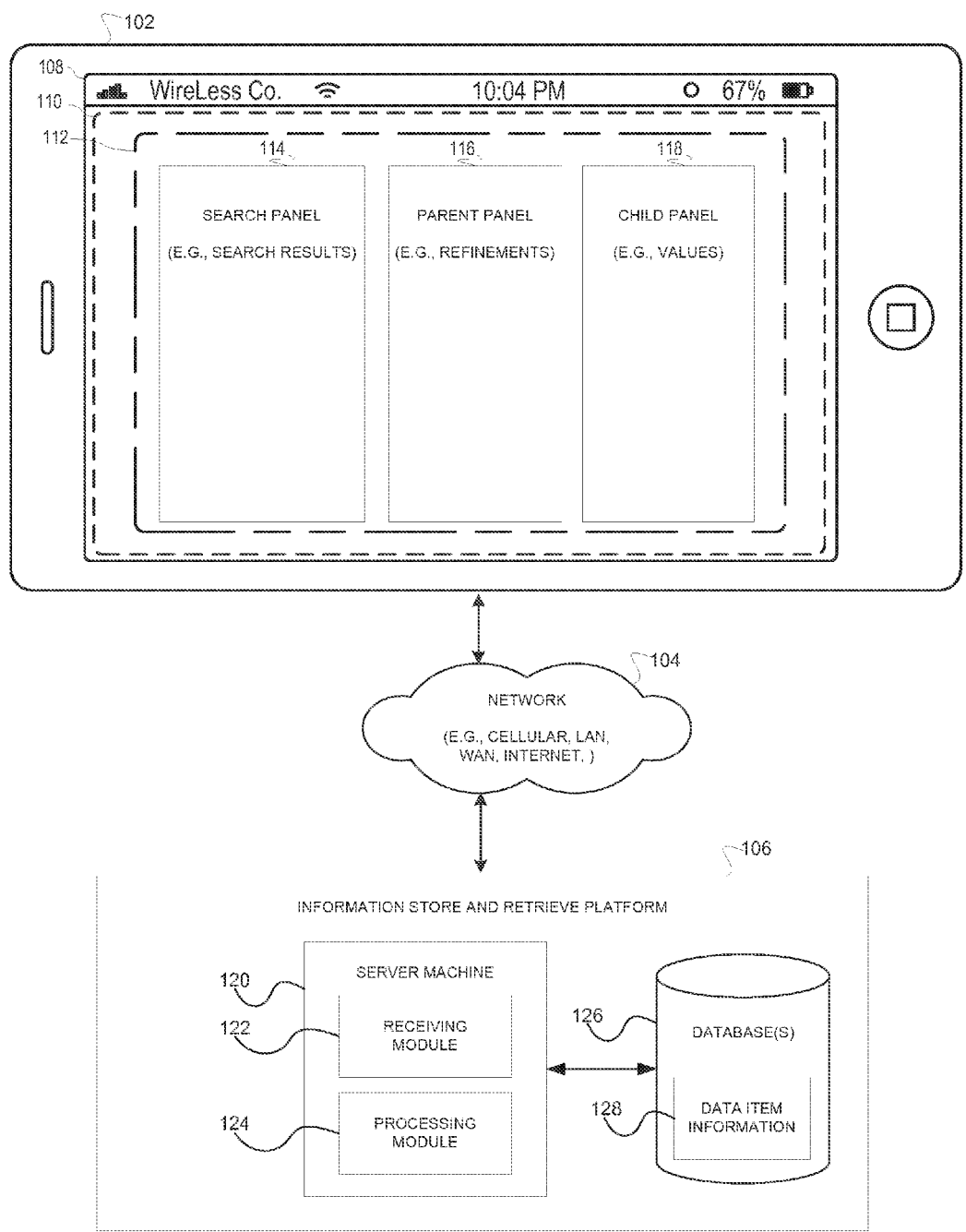
FIG. 1 illustrates a system, according to an embodiment, to refine search results.

FIG. 1 depicts a system 100, according to an embodiment, to refine search results. The system 100 may be embodied, for example, as a client machine 102 (e.g., mobile device), such as a cell phone, that communicates over a network(s) 104 in an online session (e.g., commerce session) as a client device with an information store and retrieve platform 106. The client machine 102 may include a display 108 that incorporates a touch sensitive screen 110 transparently overlaying at least a portion of the display 108. The display 108 may provide an image of a user interface 112 that is communicated from the information store and retrieve platform 106 to the client machine 102. The user interface 112 may, for example, include three panels including a search panel 114, a parent panel 116, and a child panel 118. The search panel 114 may be used to display search results including a set of data items that are identified and displayed responsive to a query that includes one or more constraints. The parent panel 116 may be used to display one or more refinements (e.g., COLOR) that are used in conjunction with values to filter the search results. The child panel 118 may display one or more values (e.g., RED) which may be used in conjunction with the refinements to filter the search results. Accordingly, a filter may include a refinement and a value (e.g., COLOR=RED) that is used to filter the search results. The user interface 112 may be communicated to the client machine 102 responsive to a search request. The touch sensitive screen 110 may facilitate a user interaction with the search results and control of the search results to further refine the search results with a filter responsive to a swiping motion(s) (described below) across the touch sensitive screen 110 that opens the parent panel 116 and child panel 118, as now shown in FIG. 1.

The client machine 102 may be embodied as a personal data assistant, an electronic tablet, or a notebook computer (not shown). The client machine 102 may further be embodied as a desktop (not shown), deskside computer system (not shown), or terminal (not shown), for example. The network 104 may include any combination of hardware, software, or technology that enables communication between the client machine 102 and the information store and retrieve platform 106. For example, the network 104 may be embodied as the Verizon 4G network, the Internet, a private wide area network (WAN), or any combination thereof. The information store and retrieve platform 106 may include a server machine 120 that includes a receiving module 122 that receives requests and communicates interfaces (e.g., user interface), a processing module 124 that processes the requests to generate the interfaces, and a database 126 that stores data item information 128 that includes data items. The information store and retrieve platform 106 may be embodied as any network accessible system that provides a search service. For example, the information store and retrieve platform 106 may be embodied as eBay®—The Worlds Online Marketplace, of San Jose, Calif., Google®, Don't Be Evil, That's Our Job, of Mountain View, Calif., or Facebook®—A Social Utility that Connects You with the People Around You, of Menlo Park, Calif. Accordingly, the search results returned may be responsive to a search of an online marketplace with a search engine (e.g., eBay), a search of the World Wide Web with a search engine (e.g., Google), or a search of a book of user profiles with a search engine (e.g., Facebook).

Contact with the touch sensitive screen 110 by a user may define a swiping motion. The swiping motion may be produced by finger tips (e.g., the tip of a thumb or a forefinger) or by any implement capable of registering contact with the touch sensitive screen 110. The swiping motion is made by moving the finger tips across the touch sensitive screen 110 performed so as to register a control input to the client machine 102 (e.g., mobile device). In one embodiment, the swiping motion is made with a single motion of the finger tips across the touch sensitive screen 110 performed so as to register a control input to the client machine 102 (e.g., mobile device). In another embodiment, the swiping motion is made with two motions of the finger tips across the touch sensitive screen 110 where the first and second motions are performed in rapid succession (e.g., less than approximately one half of a second between swipes) so as to register a control input to the client machine 102 (e.g., mobile device).

Figure 2A:
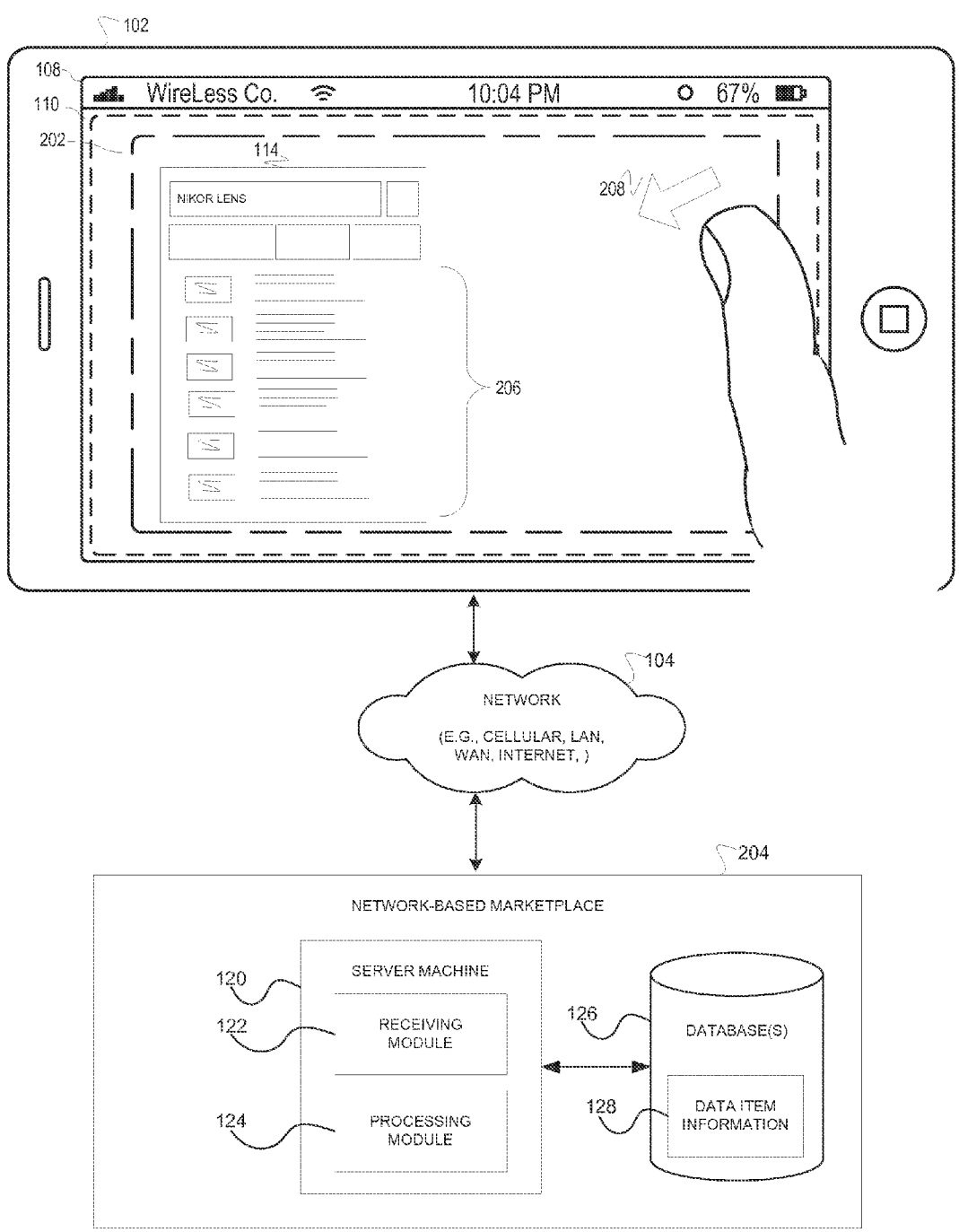
FIG. 2A illustrates a system, according to an embodiment, to refine search results.

FIG. 2A depicts a system 200, according to an embodiment, to refine search results. The system 200 corresponds to the system 100 in FIG. 1 and, accordingly, the same or similar references have been used to indicate the same or similar features unless otherwise indicated. The system 200 may include a client machine 102 (e.g., mobile device) that communicates constraints, in the form of keywords (e.g., "Nikor Lens"), over a network 104, to an information store and retrieve platform in the for of a network-based marketplace 204 (e.g., eBay) that, in turn, includes a receiving module 122 to receive the constraints and a processing module 124 to process the constraints to identify data items in the data item information 128, before generating the user interface 202 that is communicated back over the network 104 and displayed on the client machine 102 (e.g., smart phone such as an iPhone or Android). The user interface 202 may include a search panel 114, as previously described, that is shown to include search results 206 including data items in the form of listings that describe and illustrate items or services that are being offered for sale on the network-based marketplace 204. The data items in the search results 206 matched the constraints "Nikor Lens." The search results 206 are not refined. Further being illustrated is a swiping motion 208 across the touch sensitive screen 110 overlaying the display 108 so as to register a control input to the client machine 102 (e.g., mobile device) causing a request that identifies the control input (e.g. swiping motion) to be communicated to the server machine 120, at the network-based marketplace 204.

Figure 2B:
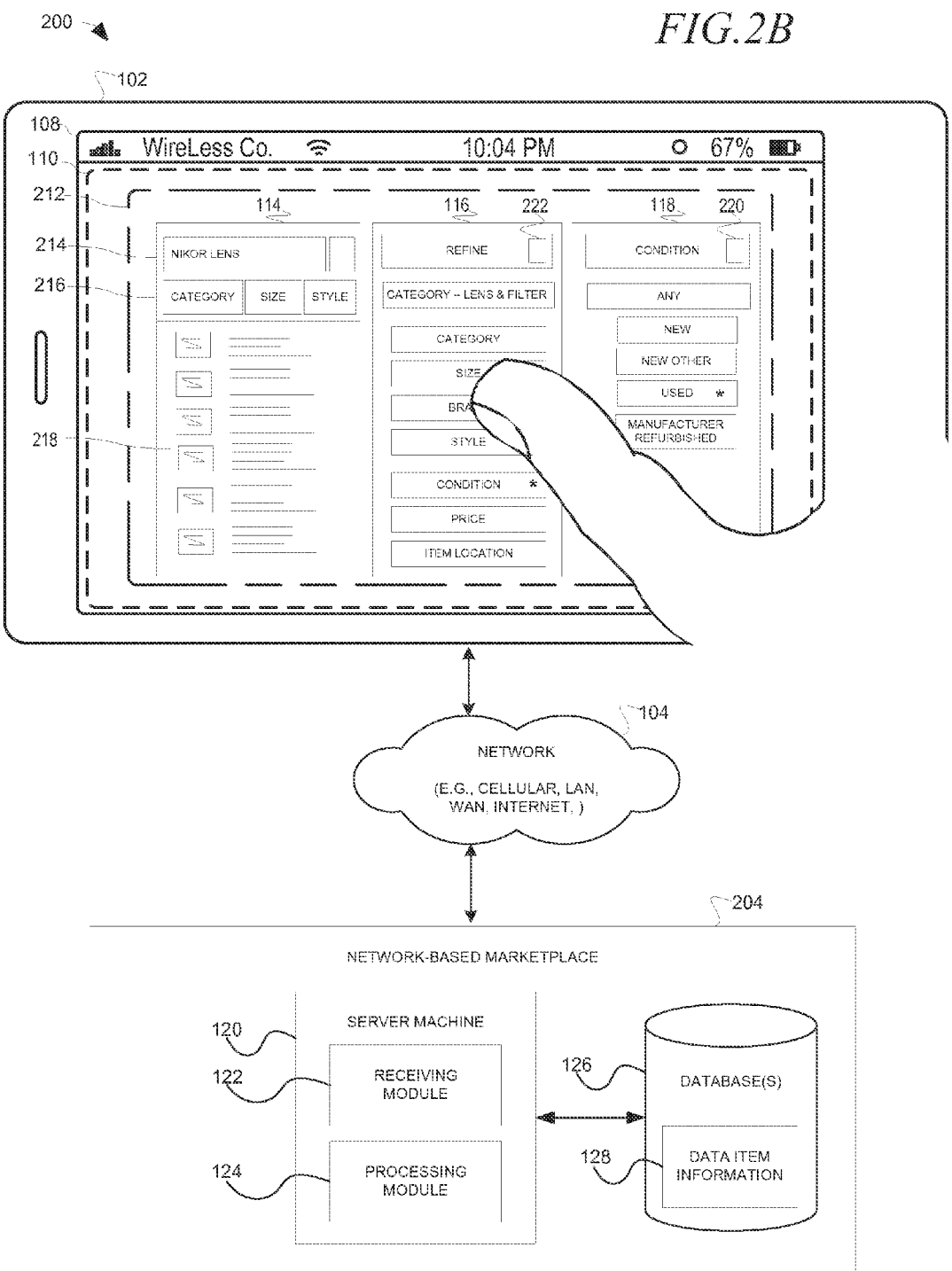
FIG. 2B illustrates a system, according to an embodiment, to refine search results.

FIG. 2B depicts the system 200, according to an embodiment, to refine search results. The system 200 corresponds to the system 200 in FIG. 2A and, accordingly, the same or similar references have been used to indicate the same or similar features unless otherwise indicated. The system 200 illustrated in FIG. 2B is the same system 200 illustrated in FIG. 2A; however, the client machine 102 now displays a user interface 212 that was communicated to the client machine 102 from the network-based marketplace 204 responsive to the network-based marketplace 204 receiving the request that identified the control input (e.g., swiping motion). The user interface 212 may include a search panel 114, a parent panel 116, and a child panel 118. The search panel 114 may include search results 218 that include data items identified based on the constraints "Nikor Lens" and now further refined based on the refinement "condition" as indicated with the asterisk in the parent panel 116 and the value "used" as indicated with the asterisk in the child panel 118. The refinement-value (e.g., "CONDITION=USED) was selected prior to the swiping motion 208 being made across the touch sensitive screen 110, as shown in FIG. 2A. The panels 114, 116 and 118 are now further described.

The search panel 114 may include a search box 214 to receive keywords, a carrousel 216 which may be slid left or right to expose and receive a refinement selection (e.g., CATEGORY, SIZE, STYLE . . . ), and the search results 218, according to one embodiment. The search panel 114 may be utilized to execute a search. The search results 218 may be refined (e.g., filtered), again, with the selection of another or different refinement-value. For example, one of the other values "New," "New Other," "Manufacturer Refurbished," etc. may be selected from the child panel 118, causing the search results 218 to again be updated. Also for example, one of the other conditions "Category," "Brand," "Camera Type," etc. may be selected from the parent panel 116, causing corresponding values to appear on the child panel 118. In addition, the carrousel 216 may be slid left or right exposing a new refinement (e.g., Brand) that, if selected, causes a corresponding set of refinements to appear on the parent panel 116. The child panel 118 may be closed by selecting a control mechanism 220, while the parent panel 116 and the search panel 114 remain open. Similarly, the parent panel 116 and the child panel 118 may be closed by selecting a control mechanism 222, leaving only the search panel 114 open.

The search results 218 may be automatically refined, according to first embodiment, utilizing a double swipe motion, or, according to a second embodiment, utilizing a single swipe motion. For both the first and second embodiments, it should be assumed that the search panel 114 is displayed on the client machine 102 (e.g., smart phone) while the parent panel 116 and the child panel 118 are closed (as shown in FIG. 2A). Also, it should be assumed that the keywords "Nikor Lens" were previously entered into the search box 214, causing the search results 218 to appear on the search panel 114, as described above in an interaction with the network-based marketplace 204.

According to a first embodiment, the search results 206 (as shown in FIG. 2A) may be automatically refined by performing a double swipe motion across a touch sensitive screen (e.g., with a thumb) of the client machine 102 (e.g., smart phone) causing the generation of the user interface 212 to include the parent panel 116 and the child panel 118 and further including the search results 218, as displayed on the search panel 114, to be visibly updated in the background (e.g., as shown in FIG. 2B).

According to the second embodiment, the search results 206 (e.g., as shown in FIG. 2A) may be automatically refined by performing a single swipe motion across a touch sensitive screen (e.g., with a thumb) of the client machine 102 (e.g., smart phone) causing the generation of the user interface 212 to include the parent panel 116 and the child panel 118 and further including the search results 218, as displayed on the search panel 114, to be visibly updated in the background (e.g., as shown in FIG. 2B).

Figure 3A:
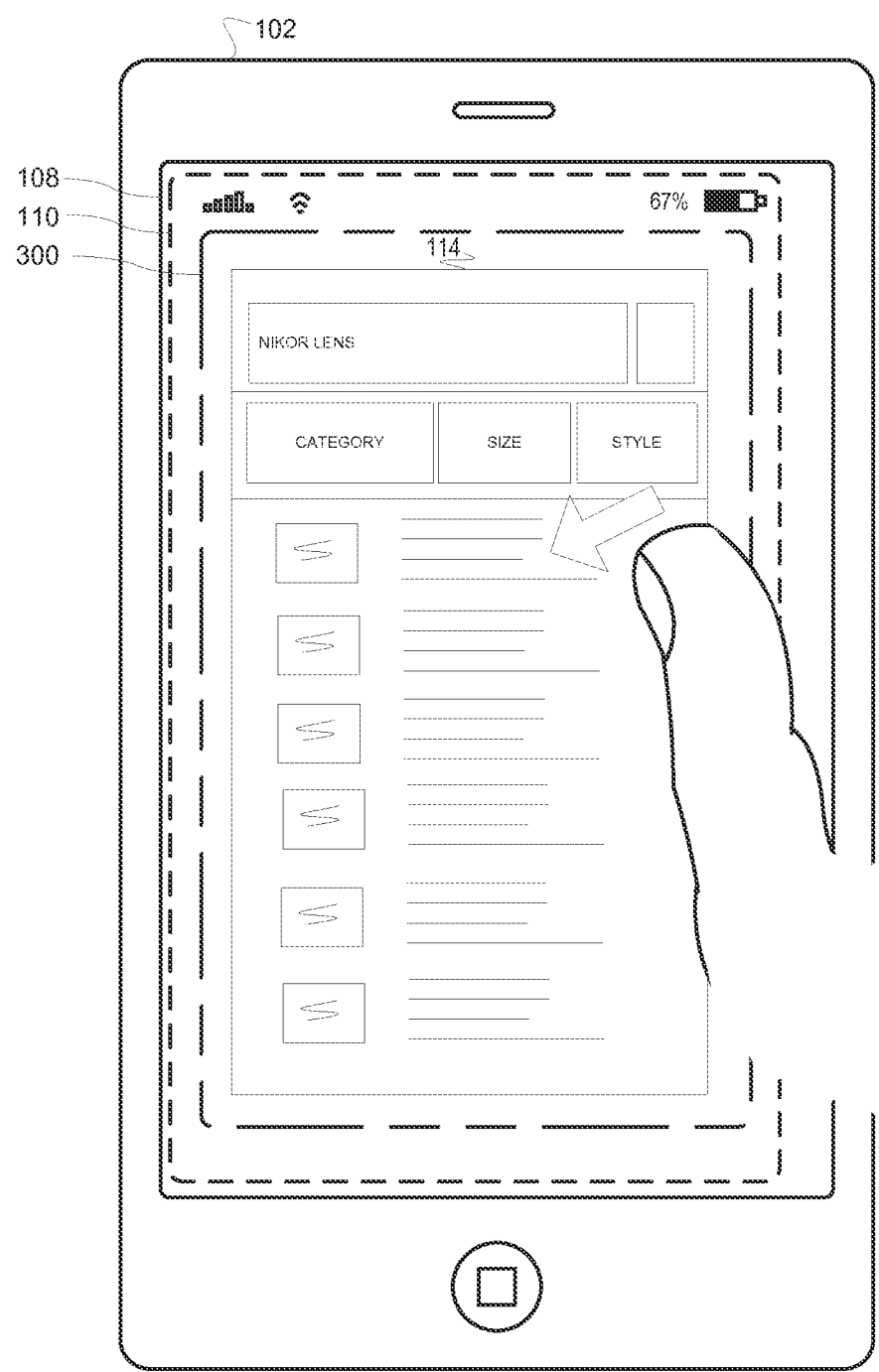
FIG. 3A illustrates a client machine, according to an embodiment.

FIG. 3A depicts a client machine 102, according to an embodiment, to refine search results. The client machine 102 illustrated in FIG. 3A corresponds to the client machine 102 in FIG. 1, FIG. 2A and FIG. 2B; accordingly, the same or similar references have been used to indicate the same or similar features unless otherwise indicated. The client machine 102 (e.g., mobile device) is oriented vertically and displays a user interface 300 that includes a search panel 114 including search results. The user interface 300 includes search results for the constraints "Nikor Lens." Accordingly, the search results include data items that match the constraints "Nikor Lens." Further illustrated is a swipe motion (e.g., with a thumb) that is being applied across the touch sensitive screen 110 of the client machine 102 (e.g., mobile device).

Figure 3B:
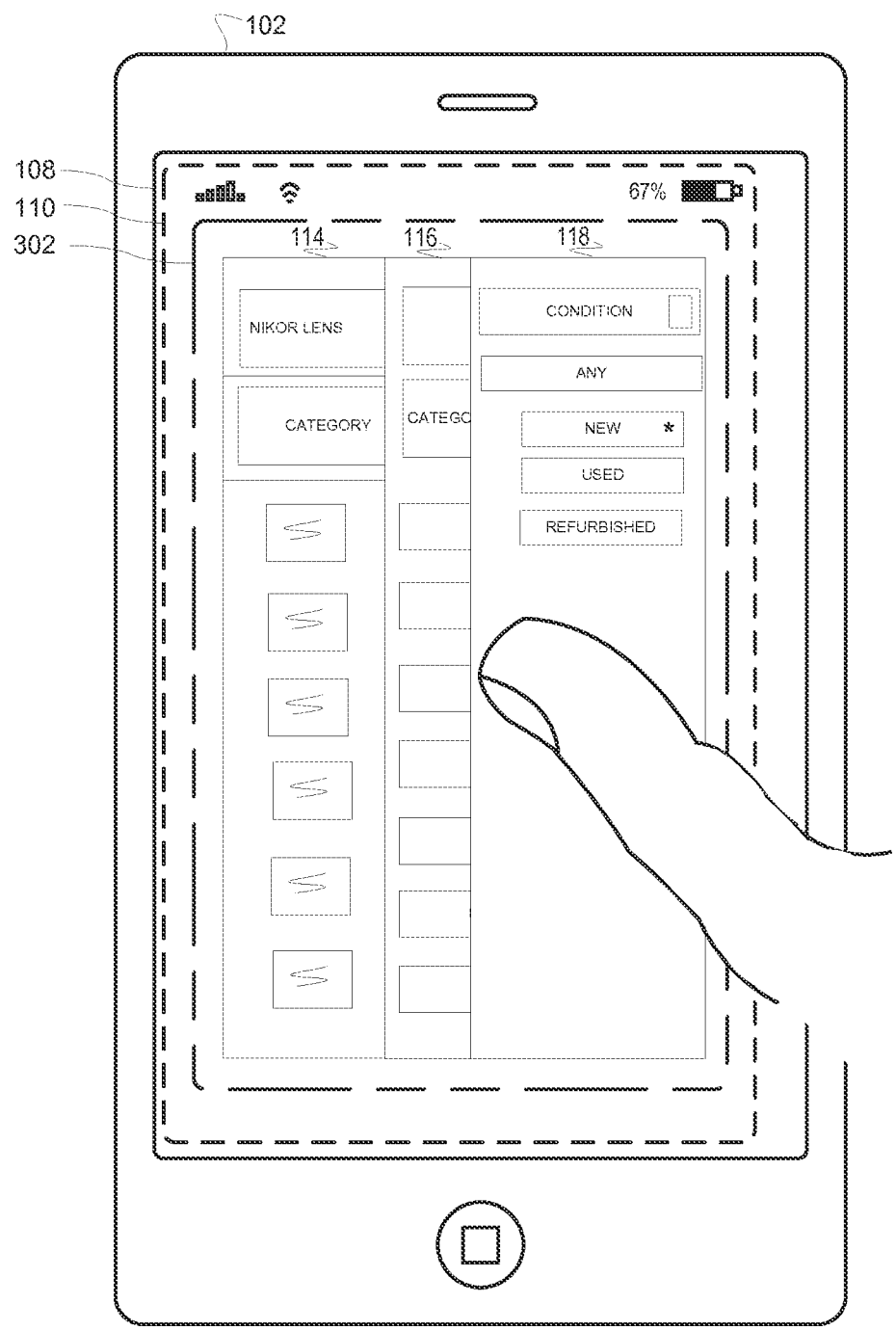
FIG. 3B illustrates a client machine, according to an embodiment.

FIG. 3B depicts a client machine 102, according to an embodiment, with refined search results. The client machine 102 illustrated in FIG. 3B corresponds to the client machine 102 in FIG. 1, FIG. 2A, FIG. 2B and FIG. 3B; accordingly, the same or similar references have been used to indicate the same or similar features unless otherwise indicated. The client machine 102 illustrated in FIG. 3B is the same client machine 102 illustrated in FIG. 3A; however, it is now updated to display a user interface 302 rather than the user interface 300 (as shown in FIG. 3A). The user interface 302 includes a search panel 114 with refined search results, a parent panel 116, and a child panel 118. The user interface 302 was received and displayed by the client machine 102 responsive to the client machine 102 communicating the request to the network-based marketplace 204 that identified the control input for a swipe motion, as shown and described in FIG. 3A. The user interface 302 includes search results for the constraints "Nikor Lens" that are further filtered with the refinement "condition" and the value "new." Accordingly, the search results include data items that match the constraints "Nikor Lens" and the refinement-value (e.g., "CONDITION=NEW).

Figure 4A:
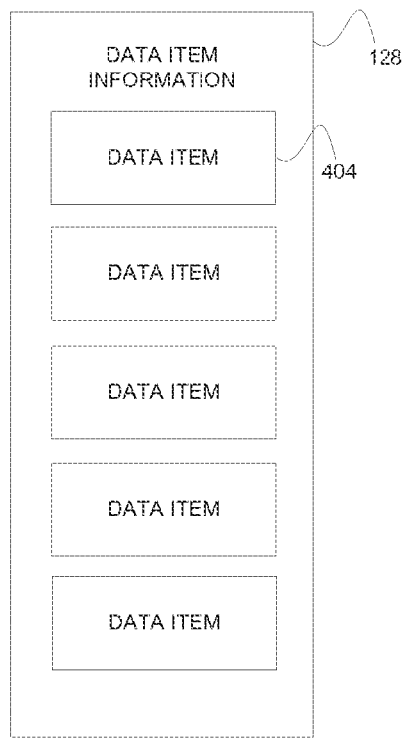
FIG. 4A illustrates data item information, according to an embodiment.

FIG. 4A illustrates data item information 128, according to an embodiment. The data item information 128 may include one or more data items 404. The data item information 128 may be searched based on constraints to identify search results that include one or more data items that match at least one of the constraints. Further, the search results may be refined to include a smaller set of data items 404 that further match refinement(s) and corresponding value(s), as previously described. The data item information 128 may further be accessed based on a key (e.g., data item identifier) that is used to uniquely identify each of the data items 404. The data item information 128 may be used to store data items 404 in the form of listings that describe items or services being offered for sale on a networked-based marketplace (e.g., eBay). Further, for example, the data item information 128 may be used to store data items 404 in the form of profiles of users (e.g., Facebook) or in the form of publications (e.g., Google).

Figure 4B:
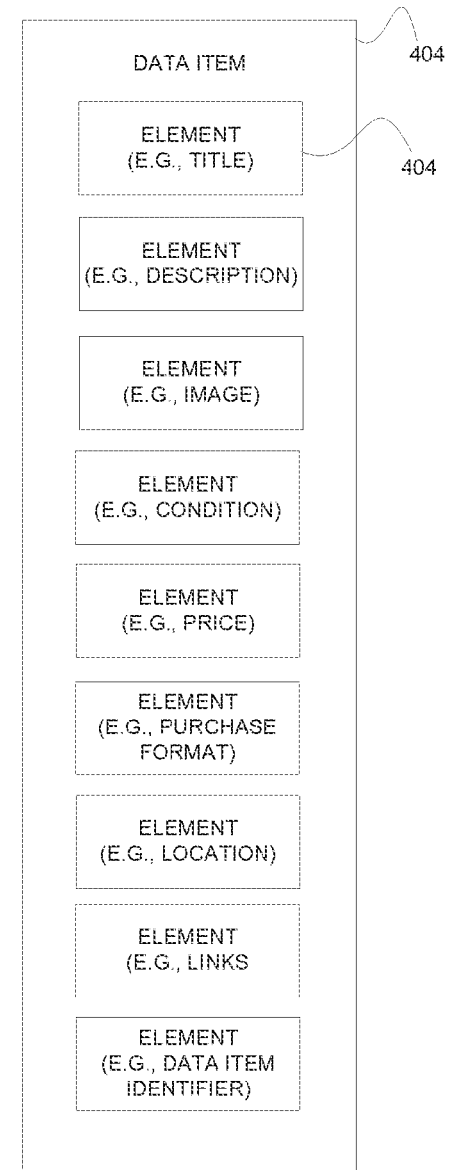
FIG. 4B illustrates a data item, according to an embodiment.

FIG. 4B is a block diagram illustrating a data item 404, according to an embodiment. The data item 404 may include one or more elements 404. The data item 404 may be used to describe a listing of an item or service that is being offered for sale on a network-based marketplace. For example, the elements 154 for a listing of the data item 404 may include a title of the data item 404, a description of the data item 404, an image of the data item 404, a condition of the data item 404 (e.g., used, new, etc.), a price to purchase the data item 404, a purchase format (e.g., auction, immediate sale), a location of the seller, links to relevant information, and a data item identifier that uniquely identifies the data item 404 from other data items 404 in the data item information 128, shown in FIG. 4A. The data item 404 may be identified by matching any of the aforementioned elements 154 with constraint(s) or refinement(s)-value(s).

Figure 5:
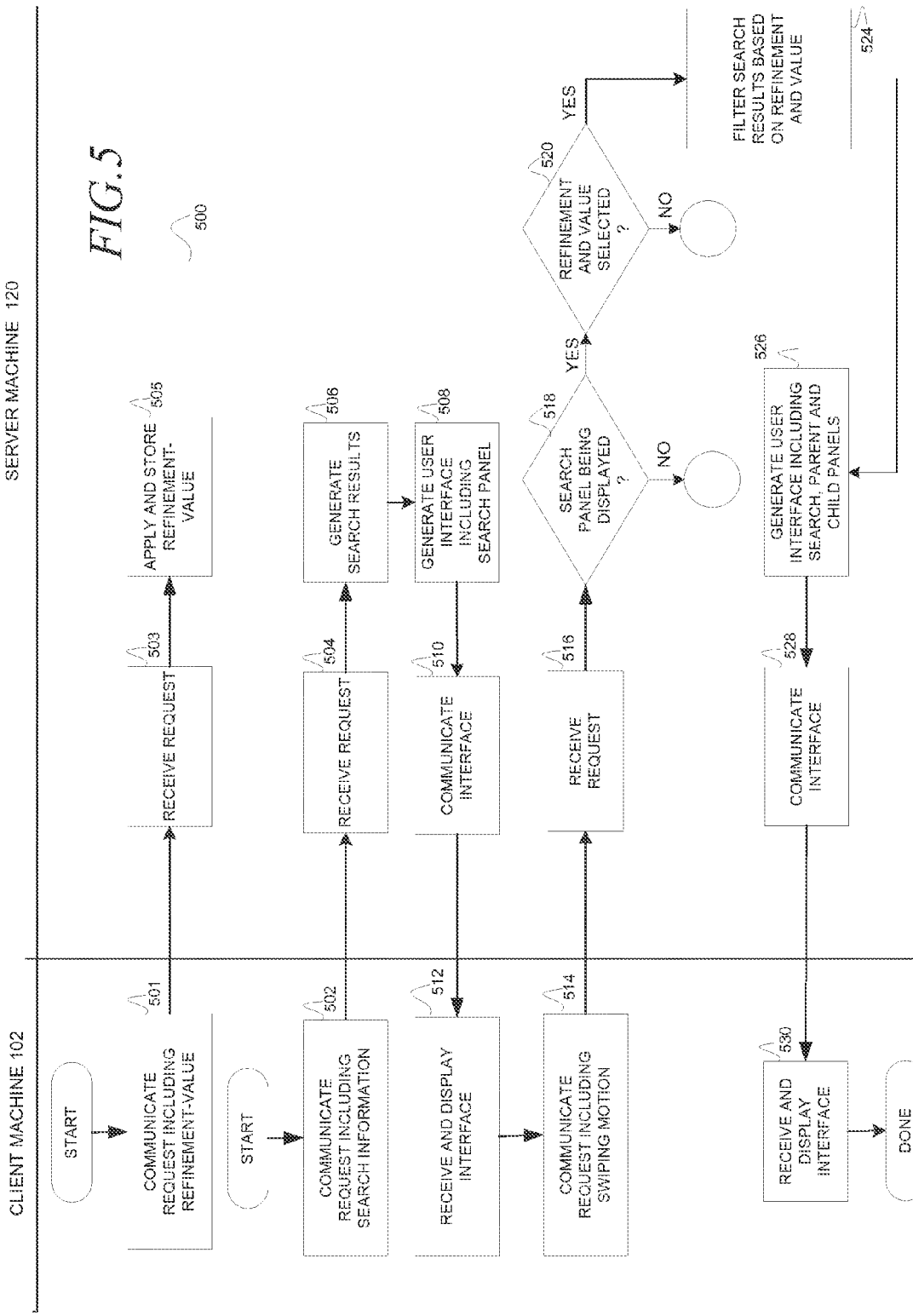
FIG. 5 illustrates a method, according to an embodiment, to refine search results.

FIG. 5 illustrates a method 500, according to an embodiment, to refine search results. Illustrated on the left is a client machine 102 and illustrated on the right is a server machine 120. The method 500 may commence at operation 501 with the client machine 102 (e.g., mobile phone) communicating a refinement-value to apply to previously identified search results. For example, the request may include the refinement-value "CONDITION=USED."

At operation 503, at the server machine 120, the receiving module 122 may receive the request to apply the refinement-value and, at operation 505, the processing module 124 may apply the refinement-value to search results and store the refinement value in association with the client machine 102. Subsequent to the display of the search results to the client machine 102 (not shown), the user may select the control mechanism 222 (as shown on FIG. 2B) to close the parent panel 116 and the child panel 118 (as shown on FIG. 2A).

At operation 502, the client machine 102 (e.g., mobile phone) may communicate search information in the form of a request to search for data items 404. The request may, for example, include one or more constraints (e.g., keywords, categories, etc.). The data items 404 may, for example, include listings that describe items or services that are being offered for sale on a network-based marketplace 106.

At operation 504, at the server machine 120, the receiving module 122 may receive the search information and, at operation 506, the processing module 124 may generate search results based on the request. For example, the constraints may include the keywords "Nikor Lens," and the processing module 124 may generate search results by identifying one or more data items 404 in the data item information 128 that match the constraints "Nikor Lens." At operation 508, the processing module 124 may generate an interface (e.g., user interfaces) based on the search results and, at operation 510, the processing module 124 may communicate the interface (e.g., user interface 202 as shown in FIG. 2A) to the client machine 102. The refinement-value "CONDITION=USED" is not presently applied to the search results that are being displayed with the interface.

At operation 512, the client machine 102 (e.g., mobile phone) may receive and display the user interface. At operation 514, the user operating the mobile device may apply a swiping motion 208 across the touch sensitive screen (e.g., touch sensitive screen 110) of the client machine 102 (e.g., mobile device), as shown in FIG. 2A, thereby causing a request that identifies the swiping motion 208 to be communicated to the server machine 120. According to one embodiment, the request may include a swiping motion flag that is being asserted and a client machine identifier that identifies the client machine 102. In one embodiment, the swiping motion 208 may be made with a single motion of the finger tips across the touch sensitive screen 110 of the client machine 102 performed so as to register a control input to the client machine 102 and causing the request to be communicated to the server machine 120. In another embodiment, the swiping motion 208 may be made with two motions of the finger tips across the touch sensitive screen 110 where the first and second motions are performed in rapid succession (e.g., less than approximately one half of a second between swipes) so as to register a control input to the client machine 102 and causing the request to be communicated to the server machine 120.

At operation 516, at the server machine 120, the receiving module 122 may receive the request. At decision operation 518, the processing module 124 may identify whether the search panel 114 is presently being displayed on the client machine 102, If the search panel 114 is presently being displayed, then a branch is made to decision operation 520. Otherwise, other processing is performed.

At decision operation 520, the processing module 124 may identify whether a refinement and a value were selected previous to the application of the swiping motion 208 across the touch sensitive screen 110 on the client machine 102. For example, according to one embodiment, the processing module 124 may access a database entry based on the client machine identifier. If, for example, the processing module 124 identifies a flag in the database entry that indicates a refinement and a value were selected prior to the application of the swiping motion 208, then the processing module 124 may retrieve the previously selected refinement and value from the database entry. Also, for example, according to yet another embodiment, the request identifying the swiping motion 208 may further include the previously selected refinement-value. If the processing module 124 identifies a refinement-value were selected previous to the application of the swiping motion 208 across the touch sensitive screen 110 on the client machine 102, then processing may continue at operation 524. Otherwise, other processing is performed.

At operation 524, the processing module 124 may filter the search results that were identified with the constraints "Nikor Lens" based on the previously received refinement-value to generate refined search results. For example, the processing module 124 may filter the search results to identify refined search results based on the refinement-value "CONDITION=USED." At operation 526, the processing module 124 may generate an interface (e.g., user interface) based on the refined search results and, at operation 528, the processing module 124 may communicate the interface to the client machine 102.

At operation 530, the client machine 102 (e.g., mobile phone) may display the interface (e.g., user interface 212 as shown in FIG. 2B).

Network-Based Marketplace

Figure 6:
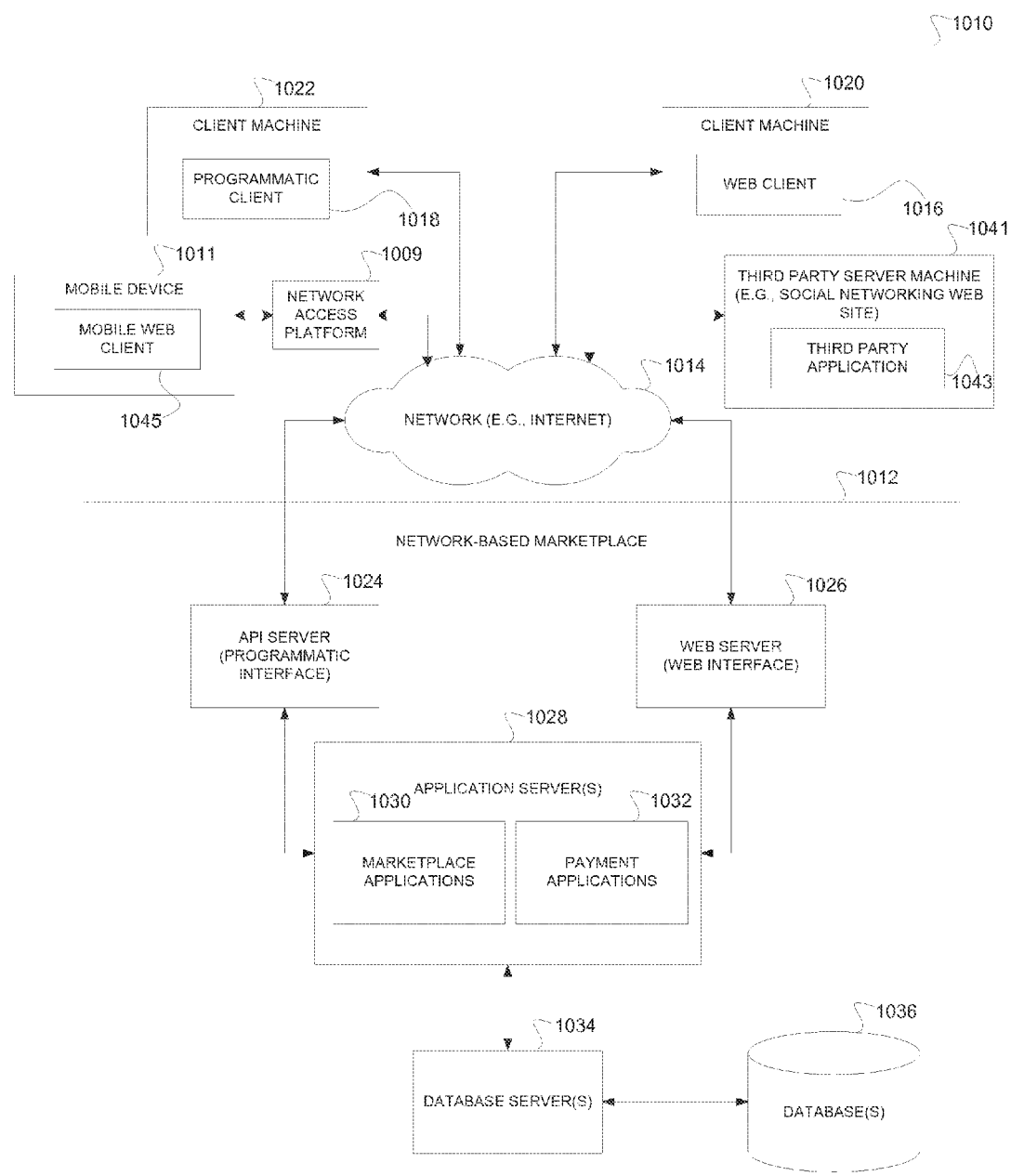
FIG. 6 illustrates a system, according to an embodiment.

FIG. 6 further illustrates a networked system 1010, according to an embodiment. The networked system 1010 corresponds to the system 100 in FIG. 1, system 200 in FIG. 2A and FIG. 2B; accordingly, the same or similar references have been used to indicate the same or similar features unless otherwise indicated. The networked system 1010 may include a network-based marketplace 1012. The network-based marketplace 1012 provides server-side functionality, via a network 1014 (e.g., the Internet or wide area network (WAN)) to one or more clients. FIG. 6 illustrates, for example, a web client 1016 (e.g., a browser, such as the Internet Explorer browser developed by Microsoft Corporation of Redmond, Wash. State) executing on client machine 1020, a programmatic client 1018 executing on client machine 1022, and a mobile web client 1045 executing on mobile device 1011 (e.g., client machine). For example, the mobile web client 1045 may be embodied as one or more mobile modules that are used to support the Blackberry™ wireless hand held business or smart phone manufactured by Research In Motion of Waterloo, Ontario.

An application program interface (API) server 1024 and a web server 1026 are coupled to, and provide programmatic and web interfaces respectively to, one or more application servers 1028. The application servers 1028 host one or more marketplace applications 1030 and payment applications 1032. The application servers 1028 are, in turn, shown to be coupled to one or more database servers 1034 that facilitate access to one or more databases 1036.

The marketplace applications 1030 may provide a number of marketplace functions and services to users that access the network-based marketplace 1012. The payment applications 1032 may likewise provide a number of payment services and functions to users. The payment applications 1032 may allow users to accumulate value in accounts and then to later redeem the accumulated value for products (e.g., goods or services) that are made available via the marketplace applications 1030. The value may be accumulated in a commercial currency, such as the U.S. dollar, or a proprietary currency, such as "points." While the marketplace applications 1030 and payment applications 1032 are shown in FIG. 6 to both form part of the network-based marketplace 1012, it will be appreciated that, in alternative embodiments, the payment applications 1032 may form part of a payment service that is separate and distinct from the network-based marketplace 1012.

Further, while the networked system 1010 shown in FIG. 6 employs client-server architecture, embodiments of the present disclosure are of course not limited to such an architecture and could equally well find application in a distributed, or peer-to-peer, architecture system, for example. The various marketplace applications 1030 and payment applications 1032 could also be implemented as standalone software programs, which do not necessarily have networking capabilities.

The web client 1016 and mobile web client 1045 access the various marketplace applications 1030 and payment applications 1032 via the web interface supported by the web server 1026. Similarly, the programmatic client 1018 accesses the various services and functions provided by the marketplace applications 1030 and payment applications 1032 via the programmatic interface provided by the API server 1024. The programmatic client 1018 may, for example, be a seller application (e.g., the Turbolister application developed by eBay Inc., of San Jose, Calif.) to enable sellers to author and manage listings on the network-based marketplace 1012 in an off-line manner, and to perform batch-mode communications between the programmatic client 1018 and the network-based marketplace 1012.

FIG. 6 also illustrates a third party application 1043, executing on a third party server machine 1041, as having programmatic access to the networked system 1010 via the programmatic interface provided by the API server 1024. The third party website may communicate user interfaces to the client machines 1022, 1020 or mobile device 1011.

The mobile device 1011 may be embodied as a mobile phone, a personal digital assistant (PDA), a cell phone, or any other wireless device that is capable of communicating with the network-based marketplace 1012. For example, the mobile device 1011 may be embodied as an iPhone mobile phone manufactured by Apple, Inc. of Cupertino, Calif. or, as previously mentioned, a Blackberry™ mobile phone manufactured by Research In Motion of Waterloo, Ontario.

Marketplace and Payment Applications

Figure 7:
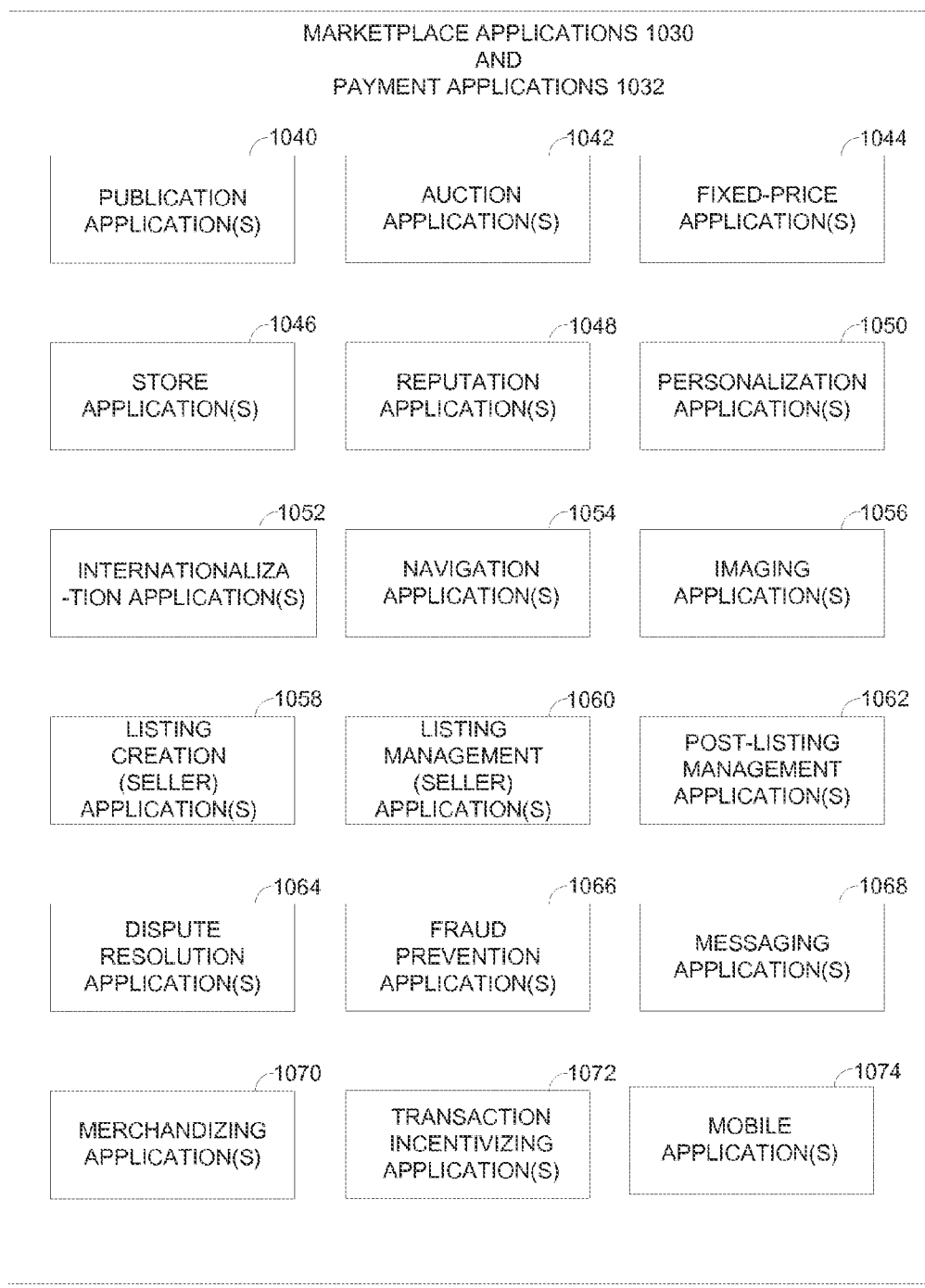
FIG. 7 is a block diagram illustrating marketplace applications and payment applications, according to an embodiment.

FIG. 7 is a block diagram illustrating marketplace applications 1030 and payment applications 1032 that, in one example embodiment, are provided as part of the networked system 1010 of FIG. 6. The marketplace applications 1030 and payment applications 1032 may be hosted on dedicated or shared server machines, as shown on FIG. 6, that are communicatively coupled to enable communications between server machines. The applications themselves are communicatively coupled (e.g., via appropriate interfaces) to each other and to various data sources, on as to allow information to be passed between the applications or so as to allow the applications to share and access common data. The applications may furthermore access one or more databases 1036 via the database servers 1034, as shown on FIG. 6. The network-based marketplace 1012 of FIG. 6 may provide a number of publishing, listing and price-setting mechanisms whereby a setter may list (or publish information concerning) goods or services for sale; a buyer may indicate a desire to purchase such goods or services; and a price can be set for a transaction pertaining to the goods or services. To this end, the marketplace applications 1030 and payment applications 1032 are shown to include at least one publication application 1040 and one or more auction applications 1042 which support auction-format listing and price setting mechanisms (e.g., English, Dutch, Vickrey, Chinese, Double, Reverse auctions, etc.). The various auction applications 1042 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 1044 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings and may allow a buyer to purchase goods or services, which are also being offered for sale via an auction, for a fixed price that is typically higher than the starting price of the auction.

Store application(s) 1046 allows a seller to group listings within a "virtual" store, which may be branded and otherwise personalized by and for the setter. Such a virtual store may also offer promotions, incentives and features that are specific and personalized to a relevant seller.

Reputation applications 1048 allow users that transact, utilizing the network-based marketplace 1012, to establish, build and maintain reputations, which may be made available and published to potential trading partners. Consider that where, for example, the network-based marketplace 1012 supports person-to-person trading, users may otherwise have no history or other reference information whereby the trustworthiness and credibility of potential trading partners may be assessed. The reputation applications 1048 allow a user to establish a reputation within the network-based marketplace 1012 over time, for example, through feedback provided by other transaction partners and by the computation of a feedback score based on the feedback. For example, the feedback score may be publicly displayed by the network-based marketplace 1012. Other potential trading partners may then reference such a feedback score for the purposes of assessing credibility and trustworthiness.

Personalization applications 1050 allow users of the network-based marketplace 1012 to personalize various properties of their interactions with the network-based marketplace 1012. For example, a user may, utilizing an appropriate personalization application 1050, create a personalized reference page at which information regarding transactions to which the user is (or has been) a party may be viewed. Further, a personalization application 1050 may enable a user to personalize listings and other properties 560 of their interactions with the networked system 1010 and other parties.

The networked system 1010 may support a number of marketplaces that are customized, for example, for specific geographic regions. A version of the networked system 1010 may be customized for the United Kingdom, whereas another version of the networked system 1010 may be customized for the United States. Some of these versions may operate as an independent marketplace, or may be customized (or internationalized) presentations of a common underlying marketplace. The networked system 1010 may accordingly include a number of internationalization applications 1052 that customize information (and/or the presentation of information) by the networked system 1010 according to predetermined criteria (e.g., geographic, demographic or marketplace criteria). For example, the internationalization applications 1052 may be used to support the customization of information for a number of regional websites that are operated by the networked system 1010 and that are accessible via respective servers 1024 and 1026 both of FIG. 6.

Navigation of the network-based marketplace 1012 may be facilitated by one or more navigation applications 1054. For example, the network-based marketplace 1012 may receive search information to search for items on the network-based marketplace 1012. A browse application may allow users to browse various category, catalogue, or inventory data structures according to which listings may be classified within the networked system 1010. Various other navigation applications 1054 may be provided to supplement the search and browsing applications. For example, the navigation applications 1054 may include the receiving module 122 and the processing module 124, according to an embodiment.

In order to mike listings available via the networked system 1010 as visually informing and attractive as possible, the marketplace applications 1030 may include one or more imaging applications 1056 with which users may upload images (e.g., thumbnail images) for inclusion within listings, An imaging application 1056 also operates to incorporate images (e.g., thumbnail images) within viewed listings. The imaging applications 1056 may also support one or more promotional features, such as image galleries, that are presented to potential buyers. For example, sellers may pay an additional fee to have an image included within a gallery of images for promoted items.

Listing creation applications 1058 allow sellers to conveniently author listings pertaining to goods or services that they wish to transact via the network-based marketplace 1012, while the listing management applications 1060 allow sellers to manage such listings. Specifically, where a particular seller has authored and/or published a large number of listings, the management of such listings may present a challenge. The listing creation applications 1058 may further facilitate a buyer watching specific listings or specific types of listings. The listing management applications 1060 provide a number of features (e.g., auto-relisting, inventory level monitors, etc.) to assist the seller in managing such listings.

One or more post-listing management applications 1062 may also assist setters with a number of activities that may typically occur post-listing. For example, upon completion of an auction facilitated by one or more auction applications 1042, a seller may wish to leave feedback regarding a particular buyer. To this end, a post-listing management application 1062 may provide an interface to one or more reputation applications 1048, so as to allow the seller conveniently to provide feedback regarding multiple buyers to the reputation applications 1048.

Dispute resolution applications 1064 provide mechanisms whereby disputes arising between transacting parties may be resolved. For example, the dispute resolution applications 1064 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 1066 implement fraud detection and prevention mechanisms to reduce the occurrence of fraud within the network-based marketplace 1012.

Messaging applications 1068 are responsible for the generation and delivery of messages to users of the network-based marketplace 1012, with such messages, for example, advising users regarding the status of listings at the network-based marketplace 1012 (e.g., providing "outbid" notices to bidders during an auction process or to providing promotional and merchandising information to users). Respective messaging applications 1068 may utilize any one of a number of message delivery networks and platforms to deliver messages to users. For example, messaging applications 1068 may deliver electronic mail (e-mail), instant message (IM), short message service (SMS), text, facsimile, or voice (e.g., voice over IP (VoIP)) messages via the wired (e.g., the Internet), plain old telephone service (POTS), or wireless (e.g., mobile, cellular, WiFi (e.g., IEEE 802.11 technologies including 802.11n, 802.11b, 802.11g, and 802.11a)), worldwide interoperability for microwave access (e.g., WiMAX-IEEE 802.16) networks.

Merchandising applications 1070 support various merchandising functions that are made available to sellers to enable sellers to increase sales via the network-based marketplace 1012. The merchandising applications 1070 also operate the various merchandising features that may be invoked by sellers and may monitor and track the success of merchandising strategies employed by sellers. In addition, the user may utilize the transaction incentivizing applications 1072 to select one or more criterion that may be used to generate a social goodness index that is used to generate a badge. Mobile applications 1074 support mobile devices that access the features and services that are provided by the network-based marketplace 1012.

Data Structures

Figure 8:
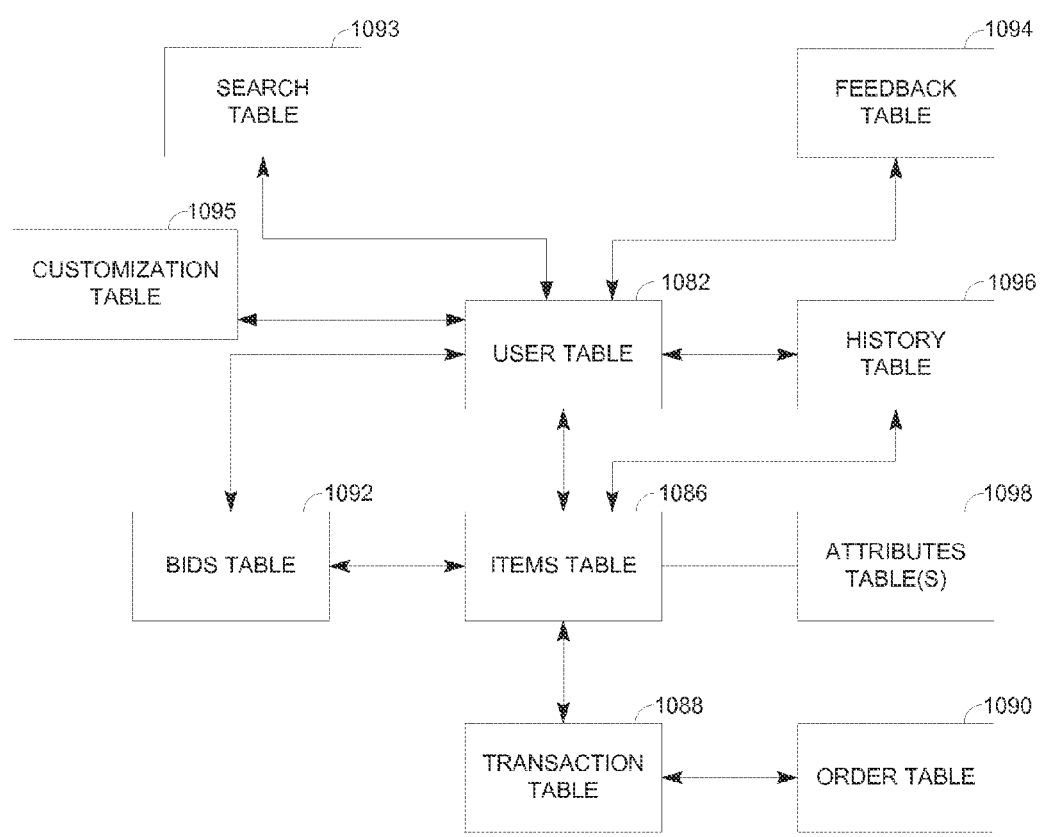
FIG. 8 is a block diagram illustrating tables, according to an embodiment.

FIG. 8 is a high-level entity-relationship diagram, illustrating various tables 1080 that may be maintained within the databases 1036 of FIG. 6, and that are utilized by and support the marketplace applications 1030 and payment applications 1032 both of FIG. 7. A user table 1082 contains a record for registered users of the network-based marketplace 1012 of FIG. 6. A user may operate as a seller, a buyer, or both, within the network-based marketplace 1012. In one example embodiment, a buyer may be a user that has accumulated value (e.g., commercial or proprietary currency), and is accordingly able to exchange the accumulated value for items that are offered for sale by the network-based marketplace 1012.

The tables 1080 also include an items table 1086 in which item records (e.g., listings) are maintained for goods and services that are available to be, or have been, transacted via the network-based marketplace 1012. Item records (e.g., listings) within the items table 1086 may furthermore be linked to one or more user records within the user table 1082, so as to associate a seller and one or more actual or potential buyers with an item record (e.g., listing). According to one embodiment, the items table 1086 may be embodied as data item information 128 and the item records may be embodied as data items 404.

A transaction table 1088 may contain a record for each transaction (e.g., a purchase or sale transaction or auction) pertaining to items for which records exist within the items table 1086.

An order table 1090 may be populated with order records, with each order record being associated with an order. Each order, in turn, may be associated with one or more transactions for which records exist within the transaction table 1088.

Bid records within a bids table 1092 may relate to a bid received at the network-based marketplace 1012 in connection with an auction-format listing supported by an auction application 1042 of FIG. 7. A feedback table 1094 is utilized by one or more reputation applications 1048 of FIG. 7, in one example embodiment, to construct and maintain reputation information concerning users in the form of a feedback score. A history table 1096 may maintain a history of transactions to which a user has been a party. One or more attributes tables 1098 may record attribute information that pertains to items for which records exist within the items table 1086. Considering only a single example of such an attribute, the attributes tables 1098 may indicate a currency attribute associated with a particular item, with the currency attribute identifying the currency of a price for the relevant item as specified by a seller.

A search table 1093 may store search information that has been entered by a user (e.g., buyer) who is looking for a specific type of listing. A customization table 1095 may store customization information for incentivizing transactions that enhance social goodness.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission e.g., over appropriate circuits and buses that connects the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a bionic environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 1014 (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture Machine-Readable Medium

Figure 9:
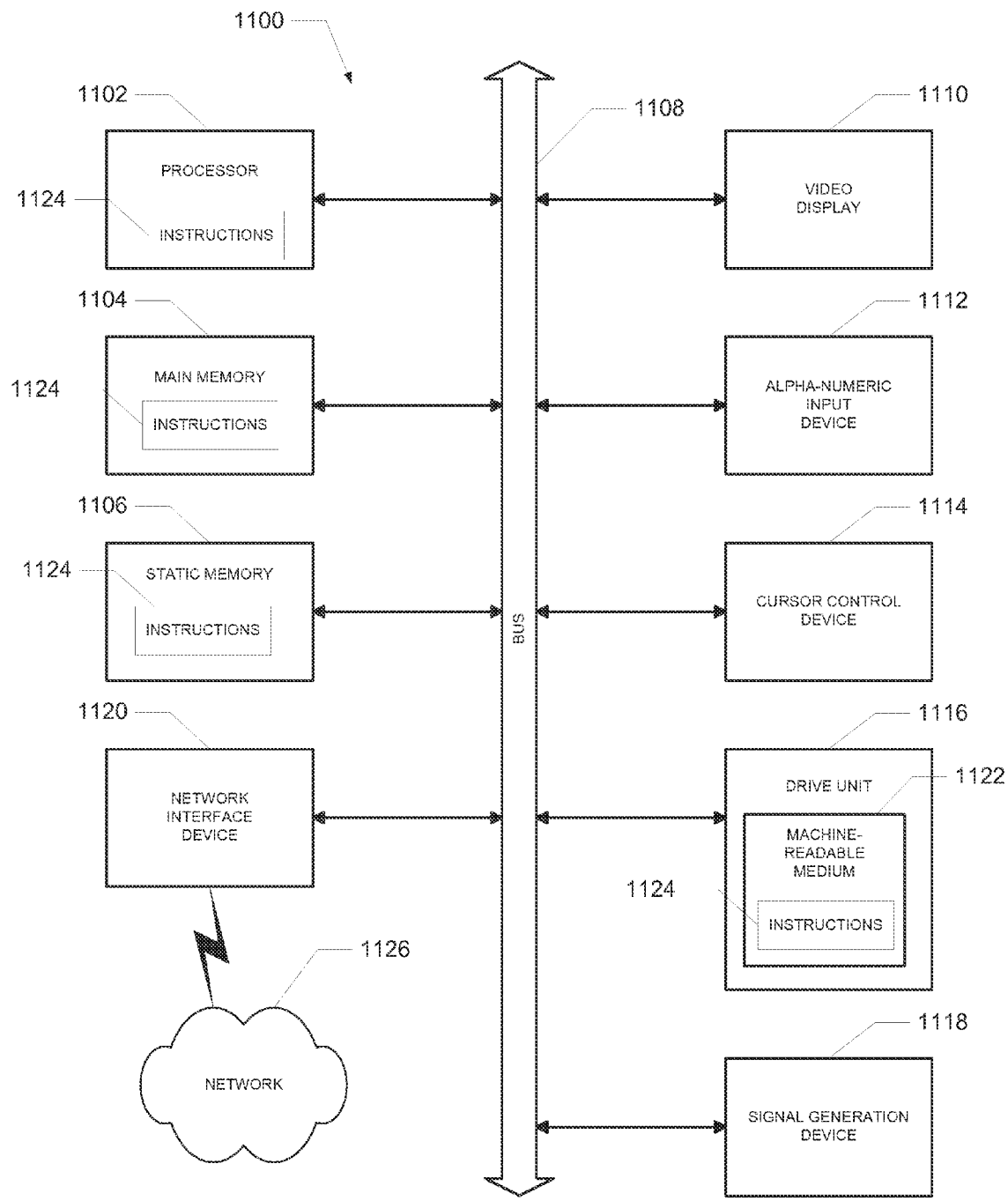
FIG. 9 shows a diagrammatic representation of a machine in the example form of a computer system, according to an example embodiment.

FIG. 9 is a block diagram of a machine within which instructions may be executed for causing the machine to perform any one or more of the methodologies discussed herein. In one example embodiment, the machine may be the client machines 102, 1022, 1020 or any other machine identified in the present application. In one example embodiment, the machine may be the mobile device 1011 or any other device or machine identified in the present application. In one example embodiment, the machine may be the server machines 120, 1024, 1026, 1028, 1034, 1041 or any of the other servers identified in the present application. In alternative embodiments, the machine operates as a standalone device or may be connected (e.g., networked) to other machines. In a networked deployment, the machine may operate in the capacity of a server or a client machine 102 in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation (or cursor control) device 1114 (e.g., a mouse), a disk drive unit 1116, a signal generation device 1118 (e.g., a speaker) and a network interface device 1120.

Machine-Readable Medium

The drive unit 1116 includes a machine-readable medium 1122 on which is stored one or more sets of data structures and instructions 1124 (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media 1122. Instructions 1124 may also reside within the static memory 1106.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding or carrying instructions 1124 for execution by the machine and that cause the machine to perform any one or more of the methodologies of the present disclosure, or that is capable of storing, encoding or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, methods and systems to refine search results were disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

What is claimed is:

1. A system comprising:
at least one processor and executable instructions accessible on a computer-readable medium that, when executed, cause the at least one processor to perform operations comprising:
receiving a first request from a mobile device, the first request being received before a second request, the first request including at least one constraint including a selected refinement and corresponding value that are stored in a database entry in association with a client machine identifier including a mobile phone identifier that identifies the mobile phone;
communicating a first user interface, over a network, the first user interface being communicated responsive to receipt of a query, the first user interface being communicated to a mobile device, the first user interface including search results, the search results including a first plurality of data items to display on the mobile device;
receiving the second request from the mobile device, the second request including an indication of at least one swiping motion that is applied across a touch-sensitive screen on the mobile device, the mobile device being associated with a mobile device identifier to access and retrieve the previously selected refinement and corresponding value from the database entry, the refinement and corresponding value being retrieved responsive to receiving the second request;
filtering the search results responsive to the receipt of the indication of at least one swiping motion to generate refined search results, the refined search results including a second plurality of data items, the filtering being based on the refinement and the corresponding values;
generating a second user interface including the refined search results, the refined search results including a second plurality of data items that are included in the first plurality of data items;
communicating the second user interface, over the network, to the mobile device, the second user interface including the refined search results including the second plurality of data items to display on the mobile device.

2. The system of claim 1, wherein the at least one swiping motion is a single swiping motion that is applied across the touch-sensitive screen on the mobile device.

3. The system of claim 1, wherein the at least one swiping motion is a double swiping motion that is applied across the touch-sensitive screen on the mobile device.

4. The system of claim 1, wherein the first user interface includes a search panel that includes the first plurality of data items, wherein the search panel further includes a search box to receive constraints that are used to identify the first plurality of data items.

5. The system of claim 1, wherein the second user interface includes a search panel that include the second plurality of data items, and wherein the search panel further includes a search box to receive constraints.

6. The system of claim 5, wherein the second user interface further includes a parent panel to receive a selection that identifies a first refinement, wherein the second user interface further includes a child panel to receive a selection that identifies a first value that corresponds to the first refinement.

7. The system of claim 6, wherein the parent panel includes a plurality of refinements that include the first refinement, wherein the first refinement is a condition of an item being offered for sale on a network-based marketplace.

8. The system of claim 6, wherein the child panel includes a plurality of values that correspond to the first refinement, wherein the plurality of values respectively describe different conditions.

9. The system of claim 1, wherein the operations are further comprising:
identifying the first plurality of data items in a database based on the at least one constraint; and
generating the first user interface including the first plurality of data items.

10. A method comprising:
receiving a first request from a mobile device, the first request being received before a second request, the first request including at least one constraint including a selected refinement and corresponding value that are stored in a database entry in association with a client machine identifier including a mobile phone identifier that identifies the mobile phone;
communicating a first user interface, over a network, the first user interface being communicated responsive to receipt of a query, the first user interface being communicated to a mobile device, the first user interface including search results, the search results including a first plurality of data items to display on the mobile device;
receiving the second request from the mobile device, the second request including an indication of at least one swiping motion being applied across a touch-sensitive screen on the mobile device, the mobile device being associated with a mobile device identifier to access and retrieve the previously selected refinement and corresponding value from the database entry, the refinement and corresponding value being retrieved responsive to receiving the second request;
filtering the search results responsive to receiving the indication of at least one swiping motion to generate refined search results, the refined search results including a second plurality of data items, the filtering being based on the refinement and the corresponding value;
generating a second user interface including the refined search results, the refined search results including a second plurality of data items including in the first plurality of data items; and
communicating the second user interface, over the network, to the mobile device, the second user interface including the refined search results including the second plurality of data items to display on the mobile device.

11. The method of claim 10, wherein the at least one swiping motion is a single swiping motion being applied across the touch-sensitive screen on the mobile device.

12. The method of claim 10, wherein the at least one swiping motion is a double swiping motion being applied across the touch-sensitive screen on the mobile device.

13. The method of claim 10, wherein the first user interface includes a search panel that includes the first plurality of data items, wherein the search panel further includes a search box for receiving constraints that are used to identify the first plurality of data items.

14. The method of claim 10, wherein the second user interface includes a search panel that include the second plurality of data items, and wherein the search panel further includes a search box for receiving constraints.

15. The method of claim 14, wherein the second user interface further includes a parent panel for receiving a selection that identifies a first refinement, wherein the second user interface further includes a child panel for receiving a selection that identifies a first value that corresponds to the first refinement.

16. The method of claim 15, wherein the parent panel includes a plurality of refinements that include the first refinement, wherein the first refinement is a condition of an item being offered for sale on a network-based marketplace.

17. The method of claim 16, wherein the plurality of refinements include a second refinement, wherein the second refinement is a category of an item being offered for sale on a network-based marketplace.

18. The method of claim 15, wherein the child panel includes a plurality of values that correspond to the first refinement, wherein the plurality of values respectively describe different conditions.

19. The method of claim 10, further comprising:
generating search results, the generating search results including identifying the first plurality of data items in a database based on the at least one constraint; and
generating the first user interface including the first plurality of data items.

20. A non-transitory machine-readable medium storing instructions that, when executed by a machine, cause the machine to perform operations comprising:
receiving a first request from a mobile device, the first request being received before a second request, the first request including at least one constraint including a selected refinement and corresponding value that are stored in a database entry in association with a client machine identifier including a mobile phone identifier that identifies the mobile phone;
communicating a first user interface, over a network, the first user interface being communicated responsive to receipt of a query, the first user interface being communicated to a mobile device, the first user interface including search results, the search results including a first plurality of data items to display on the mobile device;
receiving the second request from the mobile device, the second request including an indication of at least one swiping motion that is being applied across a touch-sensitive screen on the mobile device, the mobile device being associated with a mobile device identifier to access and retrieve the previously selected refinement and corresponding value from the database entry, the refinement and corresponding value being retrieved responsive to receiving the second request;
filtering the search results responsive to receiving the indication of the at least one swiping motion to generate refined search results, the refined search results including a second plurality of data items, the filtering being based on the refinement and the corresponding value;
generating a second user interface, the second user interfaces including the refined search results, the refined search results including a second plurality of data items that are included in the first plurality of data items; and
communicating the second user interface, over the network, to the mobile device, the second user interface including the refined search results including the second plurality of data items to display on the mobile device.

* * * * *